United States Patent

[11] 3,631,937

[72] Inventor Arthur B. Joyce
 Corinth, Miss.
[21] Appl. No. 18,080
[22] Filed Mar. 10, 1970
[45] Patented Jan. 4, 1972
[73] Assignee Tyrone Hydraulics, Inc.
 Corinth, Miss.

[54] SUPPLEMENTARY STEERING SYSTEM FOR VEHICLES
 10 Claims, 6 Drawing Figs.

[52] U.S. Cl. .................................................. 180/79.2 B,
 60/52 S, 180/79.2 R
[51] Int. Cl. .................................................. B62d 5/06
[50] Field of Search .......................................... 180/79.2 R,
 79.2 B; 60/52 S

[56] References Cited
 UNITED STATES PATENTS
3,424,262 1/1969 Kunz .......................... 180/79.2 R
1,395,001 10/1921 MacDonald .................. 180/79.2 UX
3,065,810 11/1962 Chambers et al. ............ 180/6.7
2,954,671 10/1960 Kress ........................... 60/52 S
3,280,557 10/1966 Sattavara ...................... 60/52 S
3,434,282 3/1969 Shelhart ........................ 60/52 S Primary Examiner—Benjamin Hersh
Assistant Examiner—Leslie J. Paperner
Attorney—Synnestvedt & Lechner ABSTRACT: A supplementary steering system for use with the primary hydraulic steering system of a vehicle having a steering valve. The supplementary steering system includes a supplementary pump driven by the driven shaft of the vehicle and a supplementary valve that discharges the output of the supplementary pump in the right direction to the steering valve regardless of the direction of rotation of the supplementary pump so that supplementary hydraulic fluid is available for use in steering so long as the vehicle is moving and even when the engine of the vehicle is not in operation.

PATENTED JAN 4 1972

INVENTOR.
ARTHUR B. JOYCE

BY John R. Walker, III
Attorney

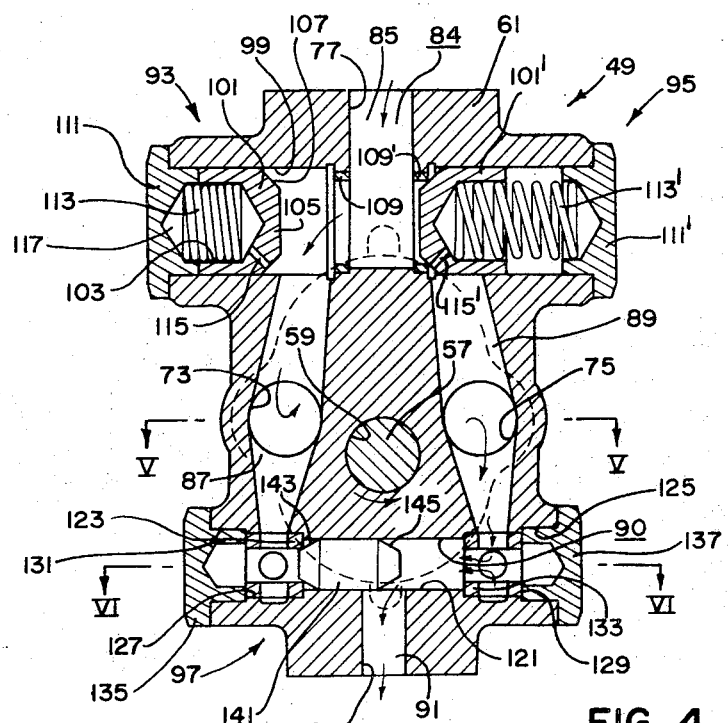
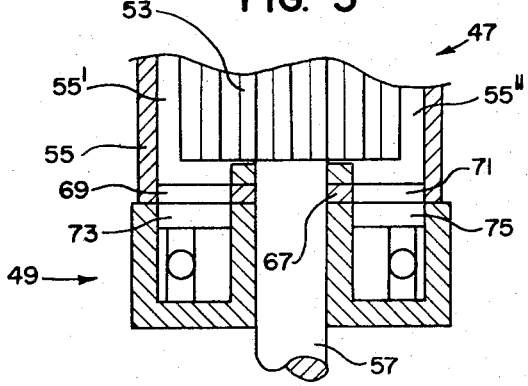
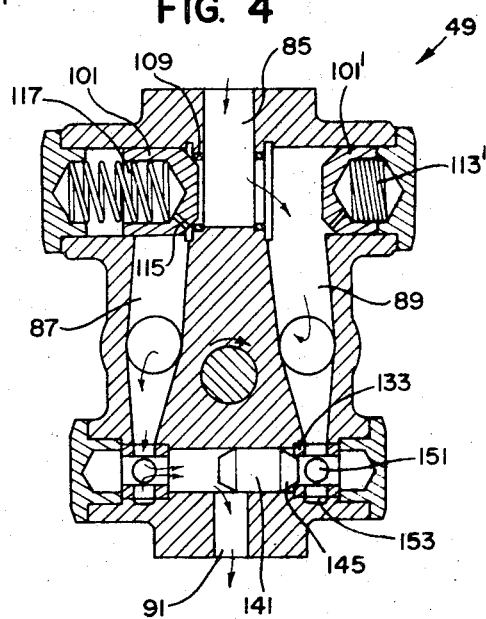
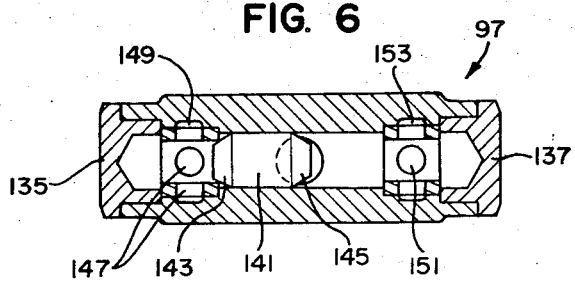

SUPPLEMENTARY STEERING SYSTEM FOR VEHICLES

BACKGROUND OF THE INVENTION

1. Field of the Invention

This invention relates to supplementary steering systems for use with hydraulic steering systems of a vehicle.

2. Description of the Prior Art

In hydraulic power steering systems of vehicles, the usual practice is to have a primary steering pump which is driven by the vehicle engine and which supplies hydraulic fluid to the steering valve that is controlled by the steering wheel. When the engine stops, as for example, if it is accidentally killed, the steering pump would stop pumping so that no fluid would be supplied to the steering valve. With an automobile, the problem is not so great since even with the power steering not functioning, the automobile can be steered manually. However, with large equipment such as rubber-tired articulated-type equipment, loss of power steering can be a dangerous situation since it is impossible to manually steer such equipment. Thus, when the engine becomes dead, the vehicle will continue in the path that it was traveling.

One attempt to solve the above-mentioned problem was by means of a so-called "accumulator" system. In this system there was an accumulator or large cylinder of oil under pressure which, when the engine died, was released by an electrical circuit to cause the oil to be transmitted to the steering valve and thus continue the power steering. This system was relatively expensive and sat idle for long periods of time before being used. Then, when it was time to use it, it might or it might not work, and could have been broken right at the beginning of the long time interval before use and a person would never know it was broken until it was needed.

SUMMARY OF THE INVENTION

The present invention is directed towards overcoming the disadvantages and problems relative to previous power steering systems for vehicles, particularly the problem in power steering after the engine has died. The concept of the present invention is to provide a supplementary steering system for heavy equipment as articulated vehicles or the like, which system includes a supplementary pump driven by the drive shaft of the vehicle and a supplementary valve that discharges the output of the supplementary pump to the steering valve so that supplementary hydraulic fluid is available for use in the steering so long as the vehicle is moving and even when the engine of the vehicle is dead. Also, it is an important concept of the present invention that the valve of the supplementary steering system is so constructed that the valve will cause the fluid from the supplementary pump to flow in the same direction towards the steering valve regardless of whether or not the supplementary pump is turning in one direction as when the vehicle is moving ahead or is turning in the opposite direction as when the vehicle is moving backwards.

An object of the present invention is to provide a highly reliable and effective means for providing fluid to the steering valve so long as the vehicle is moving, and even when the engine of the vehicle is killed.

A further object is to provide such means which, while the vehicle is moving, supplements or adds to the oil flow from the primary steering pump, thus permitting the use of a smaller size of the primary fluid pump.

DESCRIPTION OF THE DRAWINGS

FIG. 3 is a sectional view taken as on the line III—III of FIG. 2 showing the arrangement of the valves and the flow of oil when the drive shaft is turning in a counterclockwise direction as viewed in this FIG.

FIG. 4 is a similar view to FIG. 3 but showing the arrangement of the valves and the oil flow when the drive shaft is turning in a clockwise direction.

FIG. 5 is a fragmentary sectional view taken as on the line V—V of FIG. 3.

FIG. 6 is a sectional view taken as on the line VI—VI of FIG. 3.

DESCRIPTION OF THE PREFERRED EMBODIMENT

Figure 1:
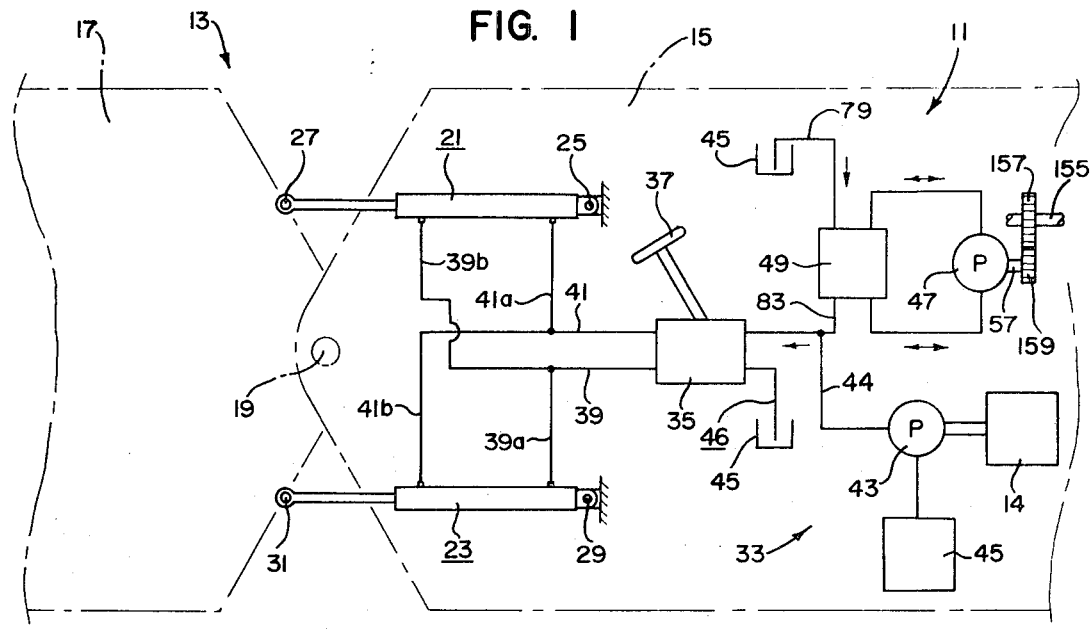
FIG. 1 is a schematic diagram of the supplementary steering system of the present invention in combination with the primary hydraulic steering system of a vehicle.

The supplementary steering system 11 of the present invention is adapted to be used with any vehicle that requires power steering, particularly big equipment such as the well-known rubber-tired articulated-type vehicle 13, such as that shown in U.S. Pat. No. 3,360,925, and having an engine 14. Vehicle 13 includes steerable ground-engaging means including a front traction unit 15 having the usual wheels or tracks, not shown, and a rear traction unit 17 having the usual rear wheels or tracks, not shown. Front and rear traction units 15, 17 are pivotally connected by suitable vertical pivot means as at 19 so that the front and rear traction units are pivotable relative to each other for steering the vehicle. Rams 21, 23 are interconnected between units 15, 17 on opposite sides of pivot means 19 with ram 21 being pivotally connected to the respective units 15, 17 at 25, 27 and ram 23 being pivotally connected to the respective units 15, 17 at 29, 31. The primary power steering system 33 is of any suitable construction and in addition to rams 21, 23 includes a suitable steering valve 35 of known construction controlled by a steering wheel 37 in a known manner to direct the flow of hydraulic fluid selectively to the piston or head ends of the steering rams 21, 23 in a known manner and to exhaust the fluid from the opposite end of the rams in a known manner to cause pivot of front and rear traction units 15, 17 relative to each other for steering the vehicle. Thus, when steering wheel 37 is moved in one direction, it will be understood that the fluid will flow to one end of rams 21, 23 through the line 39 and branches 39a, 39b to steer the vehicle 13 in one direction, and when the steering wheel is moved in the opposite direction, the fluid will flow to the opposite ends of the rams through the line 41 and branches 41a, 41b to cause steering in the opposite direction. In addition, primary steering system 33 includes a primary pump 43 which is connected to and driven by engine 14 so that the pump 43 pumps hydraulic fluid from the tank source 45 to the steering valve 35 continuously through the main fluid line 44 so long as the engine 14 is running so that fluid is provided for direction to rams 21 or 23, as above described. In addition, an exhaust fluid line 46 is provided from steering valve 35 to tank 45. Also, it will be understood that my invention is not intended to be limited to the use with an articulated vehicle, as shown, but may be adapted to steer one or more steerable wheels, as desired, as for example, the steerable wheels shown in U.S. Pat. No. 3,249,174. Additionally, vehicle 13 includes other components, not shown, as required for the operation of the particular vehicle.

Supplementary steering system 11 includes in general a supplementary pump 47 and a supplementary valve 49. Supplementary pump 47 is preferably of the gear type well known to those skilled in the art, which includes an upper gear 51 and a lower gear 53 (see FIG. 2) meshing with the upper gear and with both gears 51, 53 being respectively rotatably mounted in the supplementary pump housing (see FIG. 5) 55 to separate interior of the housing into a first chamber 55' and a second chamber 55''. Lower gear 53 is fixedly mounted on a drive shaft 57 and the drive shaft rotatably extends through an opening 59 in the body 61 of supplementary valve 49 (see FIG. 3A). Supplementary pump 47 is mounted on the back or front side of valve 49 by suitable means as the screws 63 extending through apertures, not shown, in the flanges 65 of housing 55 and threadedly into threaded sockets, not shown, provided in valve body 61. The forward wall 67 of pump housing 55 is provided with a first hole 69 in communication with first chamber 55' and a second hole 71 in communication with second chamber 55" which are on opposite sides of gears 51, 53. Holes 69, 71 are respectively in alignment with a first port 73 and a second port 75 provided in valve body 61. It will be understood from the foregoing that when hydraulic fluid is supplied to pump 47, either first hole 69 or second hole 71 acts as the inlet to the pump and the other hole not acting as the inlet acts as the discharge or outlet of the pump depending upon the direction of rotation of drive shaft 57.

Figure 2:
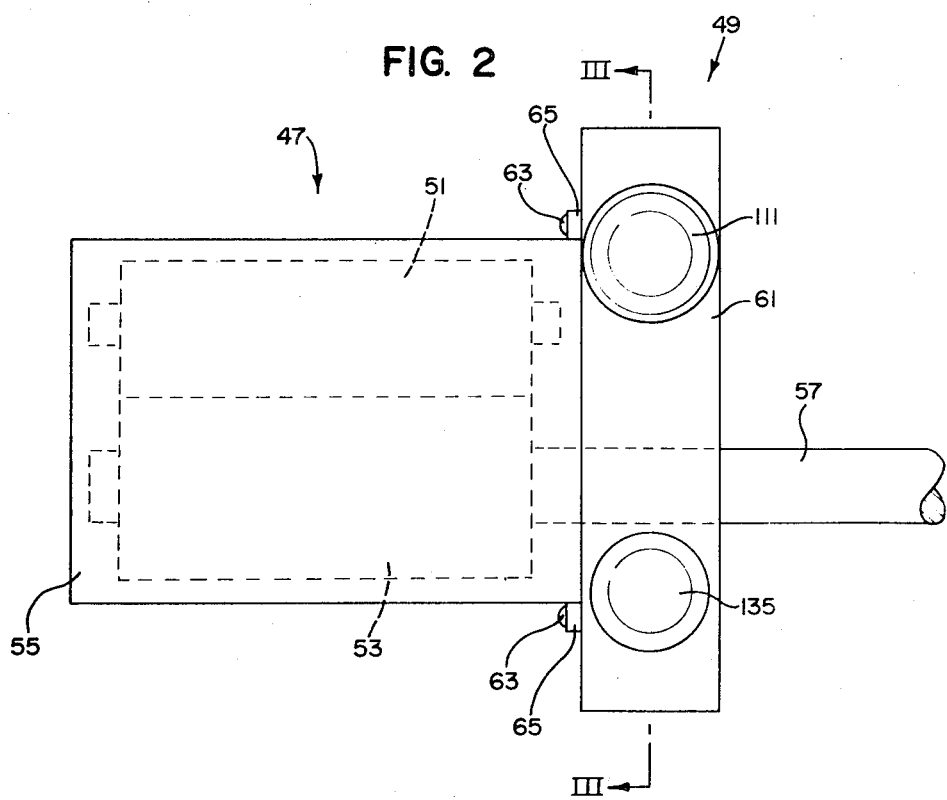
FIG. 2 is a side elevational view of the supplementary steering system of the present invention.

Body 61 is preferably substantially blocklike and is relatively narrow in its fore and aft dimension, as best seen in FIG. 2. Body 61 is provided with a fluid supply port 77 at the upper end thereof which is connected to a source of fluid supply, as tank 45, through a conduit 79. Also, valve body 61 is provided with a fluid outlet port 81 which is connected to steering valve 35 through a conduit 83 (see FIG. 1) which is connected to conduit 45 so that the hydraulic fluid is adapted to flow from port 81 through conduit 83 and a portion of conduit 45 to the steering valve 35.

The fluid passages and valve arrangement in valve assembly 49 are in general as follows: a passage 84, extending through body 61 and connecting inlet or supply port 77 with outlet port 81, including a vertical upper passage 85 leading downwardly from supply port 77 for a minor portion of the length of body 61, a vertically extending first intermediate passage 87 in communication with port 73 and extending through a portion of body 61 on one side of drive shaft 57 and a second intermediate passage 89 in communication with port 75 similar to first passage 87 but on the opposite side of shaft 57 from passage 87, a transverse passage 90, and a vertical lower passage 91 through a portion of the lower part of body 61 and leading to outlet port 81; a first check valve means generally indicated at 93 governing the flow between upper passage 85 and intermediate passage 87; a second check valve means generally indicated at 95 governing flow between upper passage 85 and second intermediate passage 89; and a shuttle valve means generally indicated at 97 governing flow between intermediate passage 87 and transverse passage 90 between second intermediate passage 89 and transverse passage 90, and between transverse passage 90 and vertical lower passage 91.

First check valve means 93 is preferably constructed as follows: a cylindrical bore 99 is provided through one side of body 61 and extends transversely inwardly into body 61 where it communicates along the lower side thereof with the upper end of first intermediate passage 87 and communicates at the inner end thereof with upper passage 85, and a pistonlike cylindrical valve member 101 slidably mounted in bore 99 for inward and outward movement. Valve member 101 is hollow and is provided with an outwardly opening central bore 103. The front wall 105 of valve member 103 is tapered or provided with a frustoconical surface 107 that is adapted to seat against the annular seat 109 when the valve is in an innermost position, as shown in FIG. 4 to close off flow between passages 85, 87. A plug 111 is provided in the outer end of bore 99 to seal off the outer end of the bore. A compression spring 113 is disposed between plug 111 and front wall 105 of valve member 101 to urge the valve member inwardly towards seating engagement with annular seat 109. A small port 115 extends through front wall 105 and is positioned so that when valve member 101 is in the closed position, as shown in FIG. 4, a restricted fluid communication is provided between first intermediate passage 87 and the chamber 117 behind valve member 101.

Second check valve means 95 is similar to first check valve means 93 so that a detailed description thereof is not deemed necessary and like parts of second check valve means 95 are numbered with the same numbers of corresponding parts on valve 93 except that on valve 95 the numbers have prime marks thereon to distinguish the two.

Shuttle valve means 97 is preferably constructed as follows.

Transverse bore 90 is provided in body 61 adjacent the lower part thereof and includes a central portion 121, enlarged portions 123, 125 at the outer ends of transverse bore 90 and intermediate portions 127, 129 respectively being disposed between central portion 121 and enlarged portions 123, 125. Annular hardened seats 131, 133 are respectively press-fitted into intermediate portions 127, 129 and plugs 135, 137 are respectively provided in enlarged portions 123, 125 to hold the seats 131, 133 in place and to close off the opposite ends of the transverse bore 90. A shuttle valve member 141, having opposite frustoconical end surfaces 143, 145, is slidably mounted in central portion 121 for seating in a first position against seat 131 as shown in FIG. 3 or for seating in the second position against seat 133 as shown in FIG. 4. A plurality of holes 147 (see FIG. 6) are radially provided in seat 131 and an annular groove 149 is provided in body 61 around seat 131 in communication with holes 147 and passage 87 so that fluid at the appropriate times can flow from passage 87 through groove 149 and into the interior of seat 131 through holes 147 and into central portion 121. It will be seen from FIGS. 3 and 4 that shuttle valve member 141, when in said first and second positions, uncovers lower passage 91 so that fluid can flow from central portion 121 into passage 91 at the appropriate time. Seat 133 and its associated parts are formed in a similar manner to seat 131 and thus includes holes 151 and a groove 153.

Shaft 57 is driven by the drive shaft 155 of the vehicle by suitable means as the gear 157 fixedly mounted on the drive shaft 155 and which gear 157 meshes with a gear 159 fixedly mounted on the shaft 57. It will be understood the drive shaft 155 is coupled to the drive wheels of the vehicle and rotates so long as the vehicle 13 is moving and regardless of whether or not the engine 14 is running. Thus, when the vehicle is moving forwardly, it will cause shaft 57 to rotate in one direction, as for example, counterclockwise and when the vehicle is moving backwards, it will cause the shaft 57 to rotate clockwise. It will be further understood that pump 43 of the primary steering system of the vehicle 13 only is actuated when the motor 14 is running.

In describing the operation of supplementary steering system 11, it is first assumed that the vehicle 13 is moving forwardly and shaft 57 is being turned counterclockwise, as viewed in FIG. 3. When the shaft 57 first begins moving counterclockwise, it will be understood that the valve members 101 and 101' will be respectively inwardly against seats 109 and 109' to close the valves 93, 95. As the supplementary pump 47 begins to turn, a suction from the pump is felt in first intermediate passage 87 through the ports 69, 73 which in turn will be felt in the chamber 117 behind valve member 101 through the small port 115. This will cause the valve member 101 to move to the left against spring 113 and open as shown in FIG. 3 to allow fluid in upper passage 85, which is supplied from tank 45 through conduit 79, to flow downwardly from upper passage 85 to passage 87 and into the pump 47 through the ports 73, 69. The pump 47 will cause the fluid to move across the gears 51, 53 to the pressure or right side of the pump, as viewed in FIG. 3, and out through the ports 71, 75 into second intermediate passage 89. From second intermediate passage 89, the fluid causes shuttle valve member 141 to move to the left as viewed in FIG. 3 to seat against seat 131 and block flow back to the first intermediate passage 87 and to allow flow downwardly through lower passage 91 and into the steering valve 35 through the conduits 83 and 44. In the meantime, a portion of the fluid pressure in second intermediate passage 89 is exerted on the outer or back side of valve member 101' through the small passage 115' to keep the valve in a closed position as shown in FIG. 3. From the foregoing, it will be understood that supplementary steering system 11 will continue to supply fluid under pressure to steering valve 35 so long as the vehicle 13 is moving in a forward direction regardless of whether or not the engine 14 is running so that if the engine 14 accidentally dies, there will still be steering for the vehicle 13. Also, the same is true if the vehicle 13 is moving rearwardly in which case the drive shaft 57 will be turning clockwise and the components will be in the position as shown in FIG. 4. Thus, in describing the operation of supplementary steering system 11, when the vehicle 13 is moving rearwardly and the drive shaft 57 is turning clockwise, as viewed in FIG. 4, the supplementary pump 47 will cause a suction in second intermediate passage 89 which will be felt on the back side of valve member 101' through the small passage 115' to cause the valve member 101' to move to the right into an open position as shown in FIG. 4 against spring 113'. The fluid from upper passage 85 will flow downwardly into second intermediate passage 89, across the gears 51, 53 and cause pressurized fluid to flow into first intermediate passage 87, which will cause shuttle valve member 141 to move to the right against seat 133, as shown in FIG. 4, whereupon fluid will flow downwardly through lower passage 91 and to steering valve 35. In the meantime, fluid under pressure will be felt behind valve member 101 through the passage 115 to keep the valve member in a closed position as shown in FIG. 4. This supplies fluid to the steering valve 35 from the supplementary steering system 11 which will continue so long as the vehicle 13 is moving backwards and regardless of whether or not the engine 14 is running.

From the foregoing description, it will be apparent the supplementary steering system 11 of the present invention acts not only as a safety feature to insure that fluid is supplied to the steering valve 35 whenever the engine 14 is killed, but also acts while the vehicle is moving as a supplement to the primary pump 43. In this way, a smaller size primary pump 43 may be utilized. Also, it will be understood that the supplementary steering system 11 is reliable and a constant check is provided thereon, which is not the case for other supplementary systems which utilize an accumulator and which only is called upon when the motor kills and which may or may not work.

It will be understood that while the form of embodiment of the invention as herein defined constitutes a preferred embodiment, it is intended not to be so limited but other equivalent forms may be provided without departing from the spirit and scope of the present invention.

I claim:

1. The combination with a vehicle having an engine, steerable ground-engaging means, fluid-operated steering rams for imparting steering movement to said ground-engaging means, a shaft rotatable in one direction or the other, respectively, corresponding with the forward or rearward movement of said vehicle, a steering valve, primary fluid supply means including a pump connected to said engine for the drive of said pump by said engine only so long as said engine is running, conduit means communicating said primary pump with said steering valve for normally supplying fluid to said steering valve, and steering means for controlling said steering valve to direct flow of fluid selectively to said steering rams; of a supplementary fluid supply means comprising a supplementary pump having a pair of holes, said supplementary pump including a rotatable shaft and including means for pumping fluid into one of said holes and out of the other of said holes when said shaft is rotated in one direction and for pumping fluid into said other of said holes and out of said one of said holes when said shaft is rotated in the opposite direction, means coupling said rotatable shaft of said supplementary pump with said shaft of said vehicle to rotate said rotatable shaft of said supplementary pump in one direction or the other, respectively, corresponding with the forward or rearward movement of said vehicle, a fluid supply reservoir, supplementary valve means communicated with said pair of holes and communicated with said fluid supply reservoir and said steering valve for directing fluid flow from said fluid supply reservoir to said supplementary pump and from said supplementary pump to said steering valve so long as said vehicle is moving and regardless of whether said vehicle is moving forwardly or rearwardly, said supplementary valve means including means operative to supply fluid to the steering valve during operation of the primary pump as well as when the primary pump is not operating.

2. The apparatus of claim 1 in which said supplementary valve means includes body means defining a first port, a second port, an inlet port in communication with said fluid supply reservoir, an outlet port in communication with said steering valve, an upper passage communicated with said inlet port, a first intermediate passage communicated with said first port, a second intermediate passage communicated with said second port, a transverse passage, and a lower passage communicated with said outlet port; and in which said supplementary valve means includes first check valve means governing flow of fluid between said upper passage and said first intermediate passage for allowing flow from said upper passage to said first intermediate passage when said shaft of said supplementary pump is rotated in said one direction and for blocking flow from said first intermediate passage to said upper passage when said shaft of said supplementary pump is rotated in said other direction, second check valve means governing flow of fluid between said upper passage and said second intermediate passage for allowing flow from said upper passage to said second intermediate passage when said shaft of said supplementary pump is rotated in said other direction and for blocking flow from said second intermediate passage to said upper passage when said shaft of said supplementary pump is rotated in said one direction, and shuttle valve means governing flow between said first and second intermediate passages and said transverse passage and between said transverse passage and said lower passage for permitting flow from said first intermediate passage into said transverse passage and from said transverse passage into said lower passage towards said steering valve when said shaft of said supplementary pump is rotated in said other direction and blocking flow from said transverse passage into said second intermediate passage when said shaft of said supplementary pump is rotated in said other direction and for permitting flow from said second intermediate passage into said transverse passage and from said transverse passage into said lower passage towards said steering valve when said shaft of said supplementary pump is rotated in said one direction and blocking flow from said transverse passage into said first intermediate passage when said shaft of said supplementary pump is rotated in said one direction, whereby fluid flow from said lower passage to said steering valve is available to actuate said steering valve so long as said vehicle is moving and regardless of whether said vehicle is moving forwardly or rearwardly and whether or not said engine is running.

3. The apparatus of claim 2 in which each of said check valve means includes means defining a bore, a valve member slidably mounted in said bore, a valve seat, spring means urging said valve member towards said seat, means defining a chamber behind said valve member, and said valve member being provided with a port communicating said chamber with the adjacent one of said intermediate passages.

4. The apparatus of claim 2 in which said supplementary pump is of the gear type including a housing, a pair of gears rotatably mounted in said housing in meshing relationship and separating said housing into a first chamber on one side of said gears communicating with said one of said holes and a second chamber on the other side of said gears communicating with said other of said holes, one of said pair of gears being fixedly mounted on said rotatable shaft of said pump.

5. The apparatus of claim 4 in which said body means includes an opening therethrough and in which said supplementary pump housing is mounted on said body means with said rotatable shaft of said supplementary pump extending through said opening.

6. A supplementary steering system for vehicles having a drive shaft, having an engine, and having a primary steering system including a steering valve, said supplementary steering system comprising a supplementary valve having a first port, a second port, an inlet port and an outlet port, said supplementary valve including means defining an upper passage communicated with said inlet port, a first intermediate passage communicated with said first port, a second intermediate passage communicated with said second port, a transverse passage, and a lower passage communicated with said outlet port; fluid source means in communication with said inlet port for supplying fluid to said supplementary valve, conduit means for communicating said outlet port with said steering valve; supplementary pump means including a rotatable shaft and having a first hole in communication with said first port for delivering fluid under pressure through said first hole and said first port to said first intermediate passage when said shaft of said supplementary pump means is rotated in a first direction and for causing a suction to be felt in said second intermediate passage through said second hole and said second port to draw any fluid in said second intermediate passage into said supplementary pump means when said shaft of said supplementary pump means is rotated in a said first direction and for delivering fluid under pressure through said second hole and said second port to said second intermediate passage when said shaft of said supplementary pump means is rotated in second direction opposite from said first direction and for causing a suction to be felt in said first intermediate passage through said first hole and said first port to draw any fluid in said first intermediate passage into said supplementary pump means when said shaft of said supplementary pump means is rotated in said second direction; means coupling said shaft of said supplementary pump means to said drive shaft of said vehicle for rotating said shaft of said supplementary pump means in said first direction when said vehicle is moving in a first direction and for rotating said shaft of said supplementary pump means in said second direction when said vehicle is moving in a second direction opposite from said first direction of movement of said vehicle; said supplementary valve means including first check valve means governing flow of fluid between said upper passage and said first intermediate passage for allowing flow from said upper passage to said first intermediate passage when said shaft of said supplementary pump means is rotated in said second direction and for blocking flow from said first intermediate passage to said upper passage when said shaft of said supplementary pump means is rotated in said first direction, a second check valve means governing flow of fluid between said upper passage and said second intermediate passage for allowing flow from said upper passage to said second intermediate passage when said shaft of said supplementary pump means is rotated in said first direction and for blocking flow from said second intermediate passage to said upper passage when said shaft of said supplementary pump means is rotated in said second direction, and shuttle valve means governing flow between said first and second intermediate passages and said transverse passage and between said transverse passage and said lower passage for permitting flow from said first intermediate passage into said transverse passage and from said transverse passage into said lower passage towards said steering valve when said shaft of said supplementary pump means is rotated in said first direction and blocking flow from said transverse passage into said second intermediate passage when said shaft of said supplementary pump means is rotated in said first direction and for permitting flow from said second intermediate passage into said transverse passage and from said transverse passage into said lower passage towards said steering valve when said shaft of said supplementary pump means is rotated in said second direction and blocking flow from said transverse passage into said first intermediate passage when said shaft of said supplementary pump means is rotated in said second direction, whereby fluid flow from said lower passage through said conduit means is available to actuate said steering valve so long as said vehicle is moving and regardless of whether said vehicle is moving in said first or second directions and whether or not said engine is running.

7. The apparatus of claim 6 in which each of said check valve means includes means defining a bore, a valve member slidably mounted in said bore, a valve seat, spring means urging said valve member towards said seat, means defining a chamber behind said valve member, and said valve member being provided with a port communicating said chamber with the adjacent one of said intermediate passages.

8. The apparatus of claim 6 in which said supplementary pump means is of the gear type including a housing, a pair of gears rotatably mounted in said housing in meshing relationship and separating said housing into a first chamber on one side of said gears communicating with said one of said holes and a second chamber on the other side of said gears communicating with said other of said holes, one of said pair of gears being fixedly mounted on said rotatable shaft of said pump means.

9. The apparatus of claim 8 in which said body means includes an opening therethrough and in which said supplementary pump housing is mounted on said body means with said rotatable shaft of said supplementary pump means extending through said opening.

10. Supplementary apparatus for use in a reversibly operable vehicle having a hydraulically operated control system, with a primary source of hydraulic operating fluid, said apparatus comprising a supplemental source of hydraulic operating fluid for the control system and including a hydraulic pump adapted to be reversibly operated according to the direction of operation of the vehicle and having chambers at opposite sides of the pump serving alternatively as suction and pressure chambers according to the direction of operation of the pump, said supplemental source further including valve means having an input port for receiving fluid from a reservoir and an output port for delivering fluid to the control system of the vehicle, input valve mechanism for delivering fluid from the input port alternatively to that one of said pump chambers which is serving as the suction chamber, and output valve mechanism for delivering to the output port fluid from that one of said pump chambers which is serving as the pressure chamber, the output valve mechanism having a valve cavity with a pair of spaced ports communicating respectively with the chambers at opposite sides of the pump, the output port for delivering fluid to the control system communicating with the output valve cavity intermediate said spaced ports, and valve means in said cavity cooperating with said output port and with said spaced ports and movable between positions in which either one or the other of said spaced ports is closed and in which the open one of said spaced ports is in communication with the output port for delivering fluid to the control system.

* * * * *